United States Patent
Langridge et al.

(10) Patent No.: US 11,274,632 B2
(45) Date of Patent: Mar. 15, 2022

(54) NOZZLE OF A TURBOMACHINE PROVIDED WITH CHEVRONS WITH A NON-AXISYMMETRIC INNER FACE

(71) Applicant: SAFRAN AIRCRAFT ENGINES, Paris (FR)

(72) Inventors: Jonathan Langridge, Melun (FR); Julien Szydlowski, Montrouge (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 337 days.

(21) Appl. No.: 16/381,326

(22) Filed: Apr. 11, 2019

(65) Prior Publication Data

US 2019/0234345 A1 Aug. 1, 2019

Related U.S. Application Data

(62) Division of application No. 14/904,330, filed as application No. PCT/FR2014/051812 on Jul. 15, 2014, now Pat. No. 10,302,043.

(30) Foreign Application Priority Data

Jul. 18, 2013 (FR) ...................... 13 57107

(51) Int. Cl.
*F02K 1/44* (2006.01)
*F02K 1/34* (2006.01)
(Continued)

(52) U.S. Cl.
CPC .................. *F02K 1/44* (2013.01); *F02K 1/34* (2013.01); *F02K 1/386* (2013.01); *F02K 1/46* (2013.01);
(Continued)

(58) Field of Classification Search
CPC ... F02K 1/34; F02K 1/386; F02K 1/44; F02K 1/46
See application file for complete search history.

(56) References Cited

U.S. PATENT DOCUMENTS 5,771,681 A 6/1998 Rudolph
7,578,132 B2 8/2009 Webster
(Continued)

FOREIGN PATENT DOCUMENTS

EP 1 340 901 A2 9/2003
EP 1 752 649 A2 2/2007
(Continued)

OTHER PUBLICATIONS

International Search Report dated Sep. 29, 2014 in PCT/FR2014/051812 Filed Jul. 15, 2014.

*Primary Examiner* — Arun Goyal
(74) *Attorney, Agent, or Firm* — Oblon, McClelland, Maier & Neustadt, L.L.P.

(57) ABSTRACT

In a cowl for a nozzle, an internal wall has a cross-section with a determined abscissa on the axis defining a neck line on the internal wall. The cowl has, downstream of the determined abscissa, indentations in the trailing edge which delimit chevrons distributed in the circumferential direction. The internal wall of the cowl diverges radially towards the interior, in a second axial half-plane passing through the tip of a chevron, from the upstream tangent on the point of the neck line in the second axial half-plane, and the lines defining the internal wall of the cowl in any axial half-plane do not have a turning point downstream of the determined abscissa of the neck line.

10 Claims, 4 Drawing Sheets

(51) Int. Cl.
*F02K 1/38* (2006.01)
*F02K 1/46* (2006.01)

(52) U.S. Cl.
CPC .... *F05D 2250/11* (2013.01); *F05D 2250/183* (2013.01); *F05D 2250/184* (2013.01); *F05D 2250/323* (2013.01); *F05D 2250/324* (2013.01); *F05D 2250/711* (2013.01); *F05D 2250/712* (2013.01); *F05D 2260/96* (2013.01)

(56) References Cited

U.S. PATENT DOCUMENTS

| | | | |
|---|---|---|---|
| 7,963,099 B2 * | 6/2011 | Renggli | F02K 1/386 60/262 |
| 8,430,203 B2 * | 4/2013 | Caruel | F02K 1/48 181/215 |
| 8,584,442 B2 | 11/2013 | Webster | |
| 9,279,387 B2 * | 3/2016 | Rose | F02K 1/48 |
| 9,617,953 B2 | 4/2017 | Webster | |
| 2003/0159428 A1 | 8/2003 | Hebert | |
| 2004/0074224 A1 | 4/2004 | Hebert | |
| 2007/0033922 A1 | 2/2007 | Reba et al. | |
| 2010/0146932 A1 | 6/2010 | Webster | |
| 2010/0193605 A1 * | 8/2010 | Johnson | F02K 1/386 239/265.11 |
| 2010/0313545 A1 | 12/2010 | Cerra et al. | |
| 2013/0327047 A1 | 12/2013 | Webster | |

FOREIGN PATENT DOCUMENTS

| | | |
|---|---|---|
| EP | 2 184 481 A2 | 5/2010 |
| FR | 3 008 739 B1 | 3/2017 |
| GB | 2532892 A | 6/2016 |

* cited by examiner

NOZZLE OF A TURBOMACHINE PROVIDED WITH CHEVRONS WITH A NON-AXISYMMETRIC INNER FACE

The present application is a divisional application based on U.S. patent application Ser. No. 14/904,330, filed on Jan. 11, 2016, which is itself based on PCT/FR2014/051812 and claims priority to French patent application 13 57107 filed on Jul. 18, 2013.

TECHNICAL FIELD

The present invention relates to the general field of reduction of the jet noise at the outlet of a turbine engine nozzle.

In particular, the present invention concerns the definition of the shape of a turbine engine nozzle which has, at its downstream end, a trailing edge comprising chevrons in order to reduce the jet noise.

PRIOR ART

It is known that the jet at the outlet of a turbine engine nozzle encounters at least one other gaseous flow. Thus:
  when the turbine engine has a single flow, this flow comes into contact with the external air bypassing the nozzle; and
  when the turbine engine has a double flow, the primary flow (or hot flow) and the secondary flow (or cold flow) come into contact with one another, but also with the external air.

The speed difference between the jet at the nozzle outlet and the other gaseous flow or flows which it encounters creates fluid shears penetrating between these gaseous flows, which causes noise, commonly designated as "jet noise". This "jet noise" is a broadband noise which is particularly inconvenient during the aeroplane take-off phase.

The use of chevrons placed in a ring at the outlet of the nozzle is a known means for substantially reducing the low-frequency components of this noise. The patent application EP1873389A1 describes chevrons which make it possible to reduce the turbulent intensity of large vortices constituting the major sources of noise. The low-frequency noise is then substantially decreased.

However, the incorporation of anti-noise chevrons in the region of the trailing edge of the nozzle is not entirely satisfactory. In fact, a pronounced inclination of the chevrons towards the outlet jet is generally necessary in order to obtain an acceptable reduction of the jet noise, which leads to a deterioration of performance levels, in particular the thrust, of the turbine engine at its different operating speeds. In addition, by decreasing the effective discharge cross-section of the internal gaseous flow of the nozzle, the inclination of the chevrons reduces the thrust ratio of the turbine engine between the take-off speed and the cruising speed. This results in a loss of operability of the turbine engine. This problem is particularly significant in the case of a convergent-divergent nozzle designed to optimise this operability.

In the patent application FR1351152, the applicant has proposed an arrangement where the cross-section of the nozzle after the neck, whilst remaining circular, forms a divergent part into which the indentations of the cowl open, the chevrons retaining a convergent part relative to the neck in order to retain their effectiveness in terms of noise reduction. Moreover, the divergent part, which is open in certain sectors due to the indentations, makes it possible to obtain an effective discharge cross-section which is sufficient for maintaining the operational performance levels of the nozzle. However, this design does not allow sufficient degrees of freedom in order to treat all cases and has drawbacks for the internal flow, creating a possible recirculation zone in the zone where the chevrons curve in order to become convergent again.

The present invention proposes an alternative in order to remedy these drawbacks and, in particular, to define the shape of a nozzle which makes it possible to achieve a greater effectiveness over all of the three criteria of performance levels, operability, and acoustics.

DESCRIPTION OF THE INVENTION

The invention relates to a cowl for a nozzle having a longitudinal axis L-L delimited radially towards the exterior by its external wall and radially towards the interior by its internal wall, the internal wall of the cowl having a cross-section with a determined abscissa $X0$ on the axis L-L defining a neck line on the wall, the upstream internal wall approaching the axis L-L by moving towards said cross-section, and said internal wall converging towards the axis L-L upstream of said cross-section and having, in any axial half-plane, a defined upstream tangent at its intersection with the neck line.

Said cowl has, downstream of said determined abscissa $X0$, indentations in the trailing edge of the cowl which delimit chevrons distributed in the circumferential direction, and is characterised in that, in the downstream direction from said determined abscissa $X0$:
  the internal wall of the cowl diverges radially towards the exterior, in a first axial half-plane passing through the top of an indentation, from the upstream tangent on the point of the neck line in this half-plane,
  the external wall of the cowl moves closer, in said first axial half-plane, to the upstream tangent on the point of the neck line in said first axial half-plane, and
  the internal wall of the cowl diverges radially towards the interior, in a second axial half-plane passing through the tip of a chevron, from the upstream tangent on the point of the neck line in said second axial half-plane.

In the present application, the terms "upstream" and "downstream" refer to the direction of the gaseous flows in a turbine engine or the nozzle thereof. A nozzle is defined as comprising a cowl of which the internal wall delimits a conduit into which an internal gaseous flow passes. A central body can be placed inside the cowl. In this case the conduit has an annular shape. A nozzle is said to be convergent (or divergent respectively) when the distance of the internal wall of the cowl from the central body or from the axis of the nozzle decreases (or increases respectively) in the downstream direction. An axial plane is understood to be a plane passing through the axis of revolution L-L, and an axial half-plane is the part of the axial plane extending on only one side of the axis L-L.

In addition, in the present application the cowl has a thickness, and is therefore of the double-wall type and comprises an external wall around which flows an external gaseous flow, in the same direction as the internal gaseous flow. This external gaseous flow may be a secondary flow of the turbine engine, or the ambient air in which the aircraft moves.

The neck cross-section serves for reference. In addition, at this location of minimal cross-section the mean direction of the gaseous flow in the nozzle is substantially parallel to the walls. Therefore, the tangent of the internal wall of the cowl to the neck gives an approximation of this direction of the gaseous flow at this cross-section. The three conditions defined in the invention therefore perform the following functions:

constructing indentations which cause the internal flow to diverge, guiding the external flow in the region of the indentations in order to promote the mixing of the flows, constructing re-entrant chevrons in the internal flow, and guiding the external flow in the region of the tips in order to promote the mixing of the flows.

On the one hand, the convergent design of the chevrons makes it possible to optimise them for reduction of the noise. On the other hand, the tops of the indentations can diverge from the axis regardless of the shape of the cross-section in the region of the chevrons, without taking account for example of the structural stresses of thickness of the cowl in the region of the chevrons. This makes it possible to obtain a larger equivalent discharge cross-section than in the previous solutions. This discharge cross-section is an important parameter in order to ensure the performance levels of the nozzle in various operating conditions, for example in order not to restrict the flow rate coefficient. In a way, the invention makes it possible to separate the geometric design parameters of the nozzle between those governing the acoustic performance levels and those governing the operational performance levels. The fact that the divergence of the external wall decreases constantly towards the top of the indentations makes it possible to decrease the separation of the external flow in this zone and thus contributes to the operational effectiveness of the nozzle. Another advantage of the invention is that it makes it possible to eliminate the part of maximum internal cross-section of the nozzle in the chevrons, corresponding to a possible separation zone.

The lines defining the internal wall of the cowl upstream and downstream of the neck line in any axial half-plane preferably have the same tangent on this neck line. This avoids disruptions in the internal flow.

The line defining the internal wall of the cowl downstream of said determined abscissa X0 in an axial half-plane passing through the tip of a chevron is preferably concave when viewed from the axis L-L, with a view to improving the re-entrant nature of the chevron and avoiding recirculation zones in the internal flow.

The line defining the internal wall of the cowl downstream of said determined abscissa X0 in an axial half-plane passing through the top of an indentation is preferably convex when viewed from the axis L-L. This accords with the fact that the internal shape of the cowl forces the internal flow to diverge in this zone and to meet the external flow opposite a confluence where the two flows would be substantially parallel.

The line defining the external wall of the cowl downstream of said determined abscissa X0 in an axial half-plane passing through the top of an indentation is also preferably concave when viewed from the axis L-L. This condition reinforces the condition on the overall convergence of the external wall in an indentation in order to indicate that the direction imposed by the external wall at the top of the indentation on the external flow is re-entrant with respect to the mean direction of the internal flow.

Advantageously, the lines defining the external wall of the cowl in any axial half-plane do not have a turning point downstream of said determined abscissa X0 of the neck line, in order to limit the risks of separation in the external flow.

Advantageously, the lines defining the internal wall of the cowl in any axial half-plane do not have a turning point downstream of the abscissa X0 of the neck line. This condition, in a similar manner to that of the external wall, limits the separation of the flow inside the nozzle.

Advantageously, the thickness of the cowl on its trailing edge is substantially constant. In fact, the thickness of the cowl is advantageously reduced to the minimum permitted by structural considerations at the tip of the chevrons in order to ensure the confluence of the two flows. It is useful to maintain this minimum thickness over all of the trailing edge in order to avoid recirculation zones due to a truncated trailing edge effect. In this way, convergent sectors can be defined around chevrons and divergent sectors can be defined around indentations, thereby organising the confluence between the external and internal gaseous flows to the cowl of the nozzle.

The invention also relates to a nozzle for a turbine engine having a longitudinal axis L-L and comprising a cowl as defined previously.

The invention also relates to a nozzle for a turbine engine having a longitudinal axis L-L and comprising a cowl as defined previously and a central body of revolution about the axis L-L.

The features of the cowl advantageously make it possible to obtain properties which are remarkable in terms of the passage cross-section of the gaseous flow. Thus it is possible to obtain such a nozzle which has a central body and in which the radial passage cross-section at a point on a wall of the cowl is defined as the square of the radial distance of said point from the axis L-L minus the square of the radial distance of the axis L-L from the point of the wall of the central body situated on the same radius when said central body is present at the abscissa on the axis L-L of said point, and by the square of the radial distance of said point from the axis L-L when this is not the case, said nozzle being characterised in that, in the downstream direction from said determined abscissa of the neck line, the radial passage cross-section of the internal wall of the cowl increases in an axial half-plane passing through the top of an indentation.

This condition corresponds to the fact that the enlargement of the radial passage cross-section in the region of the indentations aims to increase the effective passage cross-section of the nozzle, or at the very least to preserve this effective passage cross-section, in spite of the constriction in the region of chevrons, with a view to increasing the operational performance levels of the nozzle.

More generally, it is also possible to define a nozzle comprising a cowl which is delimited radially towards the exterior by its external wall and, radially towards the interior, by its internal wall, the internal wall of the cowl having a cross-section with a determined abscissa X0 on the axis L-L defining on the wall a neck line upstream of which the nozzle is convergent, said internal wall approaching the axis L-L by moving upstream towards said cross-section and having, in any axial half-plane, a defined upstream tangent at its intersection with the neck line, said cowl downstream of said determined abscissa X0 having indentations in the trailing edge of the cowl which delimit chevrons distributed in the circumferential direction;

said nozzle optionally comprising a central body of revolution about the axis L-L and surrounded by the cowl, and the radial passage cross-section at a point on a wall of the cowl being defined as previously.

Such a nozzle is remarkable in that, in the downstream direction from said determined abscissa (X0) of the neck line:

the radial passage cross-section of the internal wall of the cowl increases in an axial half-plane passing through the top of an indentation, the radial passage cross-section of the external wall of the cowl decreases in an axial half-plane passing through the top of an indentation, and the radial passage cross-section of the internal wall of the cowl decreases in an axial half-plane passing through the tip of a chevron.

The three conditions verified by the cowl in this nozzle, expressed in radial passage cross-section, refer to the progression of the passage cross-section transversely with respect to the axis L-L, as a function of the difference between the squares of the radii ($R_{exterior}^2 - R_{interior}^2$). They are easier to implement and to verify in the design of the nozzle than the conditions expressed at a distance relative to the tangent to the neck for the cowl alone. Although they are less representative of the development of the shapes with respect to the mean flow in the event of pronounced variations in the inclination of the walls around the axis L-L, they perform similar functions to the conditions defined in the first characterisation of the nozzle, in particular if the inclination of the walls is not too pronounced.

BRIEF DESCRIPTION OF THE DRAWINGS

The invention will be better understood, and other details, features and advantages of the present invention will be more clearly apparent from the following description given by way of non-limiting example and with reference to the accompanying drawings, in which.

FIRST EMBODIMENT: CIRCULAR CONVERGENT-DIVERGENT REFERENCE NOZZLE

When the cowl does not surround a central body, the rotationally symmetric cross-section of the nozzle around an axis L-L is defined by a cross-section perpendicular to the axis L-L. The surface area of a cross-section is defined solely by the radius of the internal wall of the cowl in this plane. Since the walls of the cowl are of circular cross-section, they are convergent or divergent here if the radius decreases or increases respectively in the downstream direction.

Figure 1:
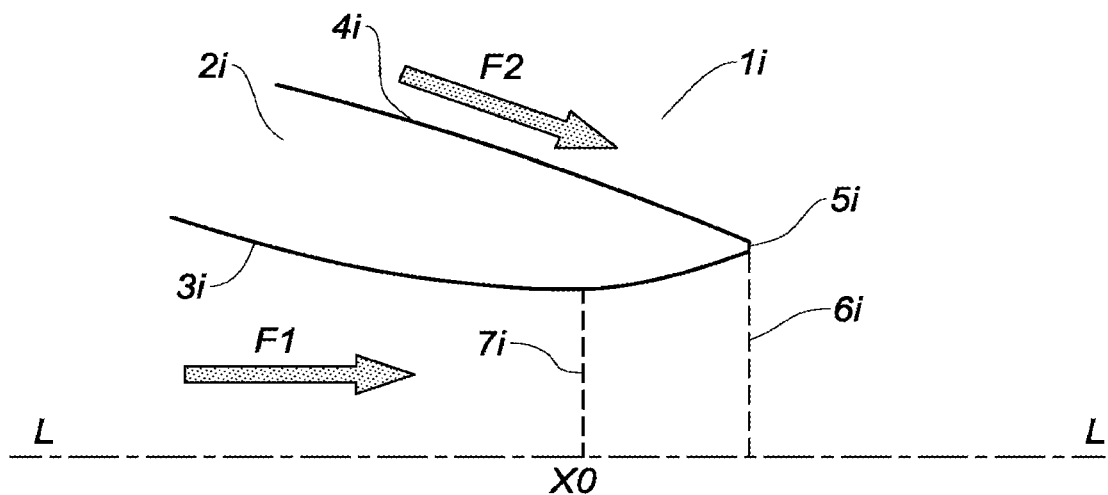
FIG. 1 is a schematic axial section of a convergent-divergent nozzle of a turbine engine, devoid of anti-noise chevrons.

FIG. 1 shows a known convergent-divergent reference nozzle 1$i$ of a single-flow turbine engine. The reference nozzle 1$i$ comprises an annular reference cowl 2$i$ having a longitudinal axis L-L and a certain thickness which decreases close to its trailing edge 5$i$. The internal wall 3$i$ of the cowl 2$i$ defines a nozzle through which an internal gaseous flow F1 passes. The external wall 4$i$ of this cowl 2$i$ is in contact with an external gaseous flow F2.

The internal 3$i$ and external 4$i$ walls are connected to one another at their downstream end, with respect to the flow direction of the flows, in order to define the trailing edge 5$i$ of the reference nozzle 1$i$ which delimits its outlet cross-section 6$i$. The internal wall of the cowl 2$i$ of the reference nozzle 1$i$ has a convergent part as far as an abscissa X0 on the axis L-L, connected to a divergent part downstream, which defines a neck 7$i$ at X0. The external wall 4$i$ of the cowl is, however, simply convergent towards the axis L-L.

The reference nozzle 1$i$ is devoid of anti-noise chevrons but it is suitable for a turbine engine (not shown) upstream of the convergent-divergent part shown in FIG. 1. As a function of the conditions on the internal flow which are imposed by this turbine engine upstream of the nozzle and are different according to the flight conditions, the nozzle is designed to correspond in particular to:

a thrust coefficient at cruising speed $CT_{RC}$, which gives the ratio between the thrust and the conditions which generate the internal flow F1 and are created by the turbine engine;

a difference CV_DV, between the flow rate coefficient at take-off speed $CD_{CTO}$ and that at cruising speed $CD_{CC}$, which is required to be positive in order to increase the operability of the engine (passing on the good flow in order to avoid pumping, flotation or overheating).

A cowl 2 defined according to the invention is designed in order to obtain an optimised nozzle 1 which has the same thrust coefficient $CT_{RC}$, the same difference of flow rate coefficient CV_DV, and which additionally supplies a gain ΔEPNdB with respect to the intensity of the jet noise of the reference nozzle 1$i$. The jet noise can for example be measured and/or estimated at a predefined distance from the outlet cross-section 6 or 6$i$ of the relevant nozzle, respectively the optimised nozzle 1 or the reference nozzle 1$i$.

Figure 2:
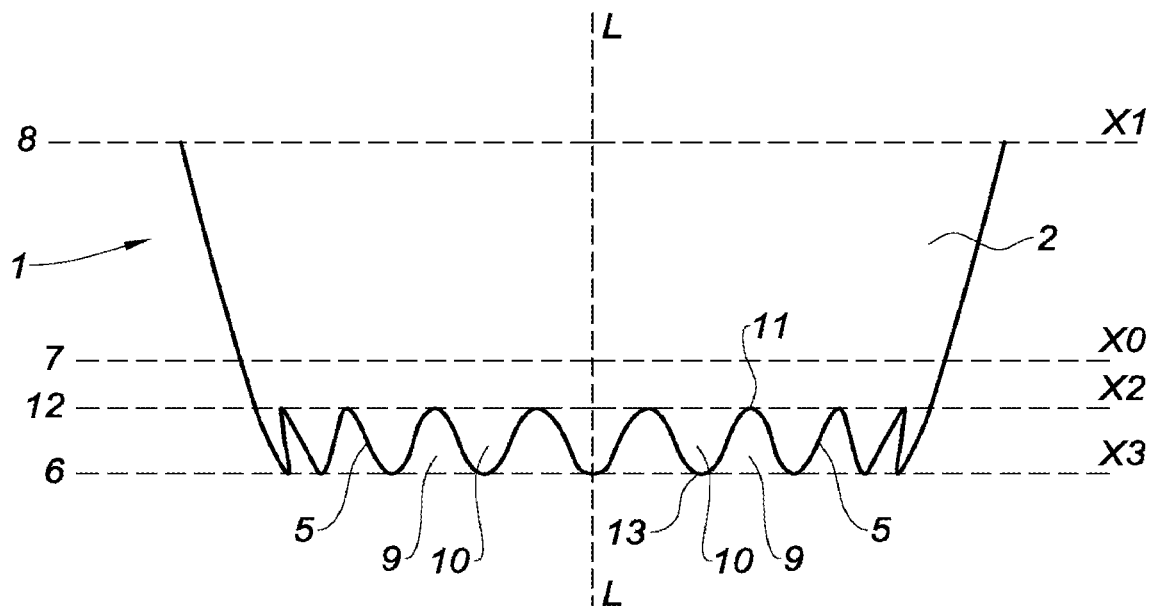
FIG. 2 is a schematic profile view of the rear of a nozzle cowl defined in accordance with the present invention, which comprises anti-noise chevrons.

FIG. 2 shows an example of a cowl 2 to the rear of an optimised nozzle 1 defined in accordance with the present invention. The shape of the internal wall 3 of the cowl 2 is identical to that of the internal wall 3$i$ of the cowl 2$i$ up to the abscissa X0 on the axis L-L, corresponding to the cross-section of neck 7. This cross-section defines a circular neck line 71 on the internal wall 3, as shown on FIG. 4. Moreover, the tangent of the internal wall 3, upstream, in an axial half-plane passing through any point on the neck line 71 is substantially parallel to the axis L-L. By way of example, the shape of the external wall 4 of the cowl 2 is identical to that of the external wall 4$i$ of the cowl 2$i$ up to an abscissa X1 on the axis L-L, corresponding to a sectional plane 8 upstream of the abscissa X0 of the neck 7. In another embodiment, it is possible for the zone in which the external wall 4 of the cowl 2 is modified to be defined differently.

Downstream of the abscissa X0 of the neck 7, the trailing edge 5 of the cowl 2 of the optimised nozzle 1 describes indentations 9 of substantially triangular shape having a rounded top 11. Thus the indentations 9 define anti-noise chevrons 10 also of substantially triangular shape and having a rounded tip 13, in the extension of the wall of the cowl 2. Of course, the indentations and the chevrons could have any other appropriate shape (for example trapezoidal).

The indentations 9, regularly spaced from one another in the circumferential direction (although this could be different), are defined by a base situated on a circular 6 cross-section, limiting the downstream extension of the cowl, and by a top 11, situated on a sectional plane 12 of the abscissa X2, downstream of the neck 7. In the same way, the chevrons 10 defined by a tip 13 situated on the end circular cross-section 6 and by a base situated on the intermediate sectional plane 12, are regularly spaced from one another. Furthermore, although it could be otherwise, in the example of FIG. 2, the indentations 9 are identical to one another. Therefore the same applies to the chevrons 10. Finally, in the example shown, the abscissa X3 of the circular cross-section 6 on which the tips 13 of the chevrons are located is offset from that of the outlet cross-section 6i of the reference nozzle 1i. However, this abscissa forms part of the adjustable parameters in the design of the new nozzle according to the invention. Therefore an embodiment may be provided in which the circular cross-section 6 would be placed differently.

Figure 3:
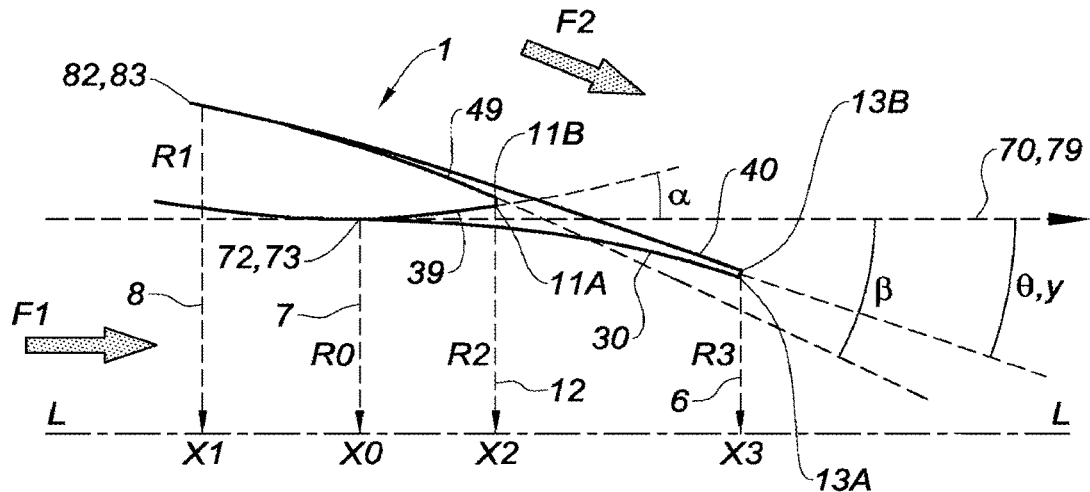
FIG. 3 is a superimposition of the schematic cross-sections of the rear of the cowl of FIG. 2, along the axial half-planes passing through the tip of a chevron and through the top of an indentation.

As FIG. 3 shows, the shape of the cowl 2 according to the invention is defined so as to:
 firstly, obtain chevrons 10 of which the internal wall is convergent from the neck 7 and which chevrons re-enter the flux F1 leaving the nozzle in order to optimise the anti-noise performance thereof;
 secondly, on the contrary, allow the possibility for the nozzle to diverge at the top 11 of the indentations 9 in order to offer a wider equivalent outlet cross-section to the internal flow F1 and to maintain the operational performance levels of the nozzle;
 thirdly, retain a convergent shape of the external wall 4 of the cowl 2 towards the trailing edge 5 in order to convey the external flow F2 into the internal flow F1 and promote the mixing thereof.

In order to achieve this object, first of all the profile of the walls of the cowl 2 is defined in the axial half-planes passing through the ends of the chevrons and of the indentations. These lines are defined with the aid of splines or any other means known to a person skilled in the art by imposing a certain number of conditions on said lines.

In an axial half-plane passing through the top 11 of an indentation 9:
 The internal wall 3 of the cowl 2, illustrated in FIG. 4, forms, between the sectional point 72 of the neck 7 and the internal point 11A at the top 11 of the indentation, a line 39 determined by the internal radius R0 of the neck 7, the abscissas X0 of the point 72 on the neck and X2 of the internal point 11A, the radius R2 defining the distance of the axis L-L from the point 11A, and an angle $\alpha$ with the axis L-L, imposed on the tangent of the line 39 at the point 11A.
 The external wall 4 of the cowl 2, illustrated in FIG. 4, forms, between the point 82 on the abscissa X1 and the external point 11B at the top 11 of the indentation, a line 49 determined by the abscissa X1, the radius R1 of the external wall at the point 82, the abscissa X2 of the external point 11B (identical to that of the point 11A on the example shown), by the thickness e of the cowl at the trailing edge 5 (indicated in FIGS. 4 and 5), radially separating the points 11A and 11B, and an angle $\beta$ with the axis L-L, imposed on the tangent of the line 49 at the point 11B.

In an axial half-plane passing through the tip 13 of a chevron 10:
 The internal wall 3 of the cowl 2 forms, between the sectional point 73 of the neck 7 and the internal point 13A at the tip 13 of the chevron 10, a line 30 determined by the internal radius R0 of the neck 7, the abscissas X0 of the point 73 on the neck and X3 of the internal point 13A, the radius R3 defining the distance of the axis L-L from the point 13A, and an angle $\theta$ with the axis L-L, imposed on the tangent of the line 30 at the point 13A.
 The external wall 4 of the cowl 2 forms, between the point 83 on the abscissa X1 and the external point 13B at the tip 13 of the chevron 10, a line 40 determined by the abscissa X1, the radius R1 of the external wall at the point 83, the abscissa X3 of the external point 13B at the tip of the chevron (equal to that of the internal point 13A on the example shown), by the thickness e of the cowl at the trailing edge 5, radially separating the points 13A and 13B, and an angle $\alpha$ with the axis L-L, imposed on the tangent of the line 40 at the point 13B.

Furthermore, the internal radius R2 at the internal point 11A of the top of the indentation 9 is required to be greater than the internal radius R0 at the neck 7, and the internal radius R3 at the internal point 13A on the tip of chevrons is required to be less than the same internal radius R0 at the neck 7.

Moreover, the lines 30, 39, 40 and 49 are required to be connected tangentially to the upstream surfaces of the initial cowl. This implies in particular that the tangents 70 and 79 of the lines 30 and 39 respectively, at the points 73 and 72 on the neck line 71, form an angle of substantially zero with the axis L-L. Furthermore, as FIG. 3 shows, in the axial half-plane these lines are required not to have turning points. In particular, the line 30 defining the internal wall 3 between the neck 7 and the tip 13A of a chevron must be constantly convergent, that is to say that its distance from the axis L-L decreases towards the tip 13A. Likewise the angles $\beta$ and $\alpha$ are required to be negative, that is to say that the external face 4 of the cowl converges towards the axis L-L at the corresponding ends.

These conditions can be reformulated with respect to the mean direction of the internal flow F1 at the neck 7 which is substantially parallel to the axis L-L, and therefore to the tangent of the internal wall 3 to the neck line 71:
 In the downstream direction,
 the re-entrant chevron 10 in the internal flow F1, the sectional line 30 in the axial half-plane passing through the tip 13 diverges radially towards the interior of the tangent 70 to the neck,
 as the indentation 9 is divergent for the internal flow F1, the sectional line 39 in the axial half-plane passing through the top 11 diverges radially towards the exterior of the tangent 79 to the neck, and
 the sectional line 49 in the axial half-plane passing through the top 11 moves radially closer to the tangent 79 to the neck, directing the external flow F2 towards the flow F1.

Figure 4:
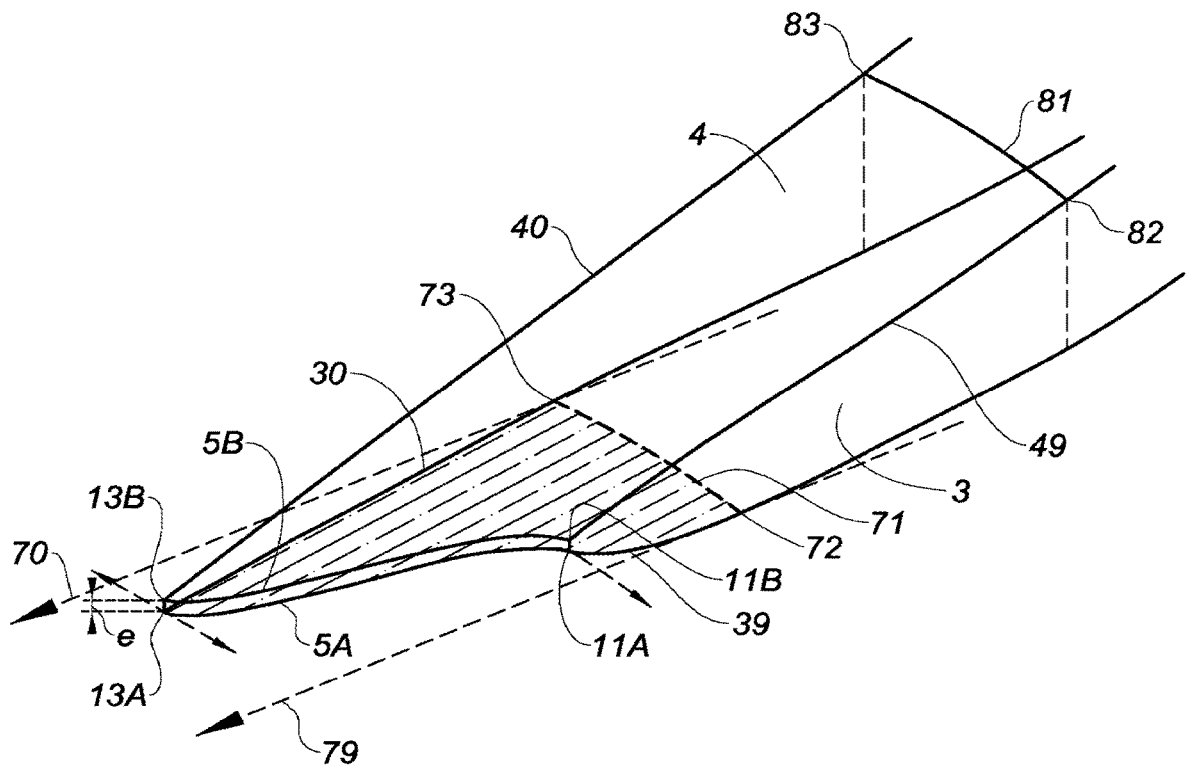
FIG. 4 is an enlarged schematic perspective view of the construction by lines in the axial half-planes of the external and internal surfaces of the cowl, in the region of the chevrons and of the indentations.
Figure 5:
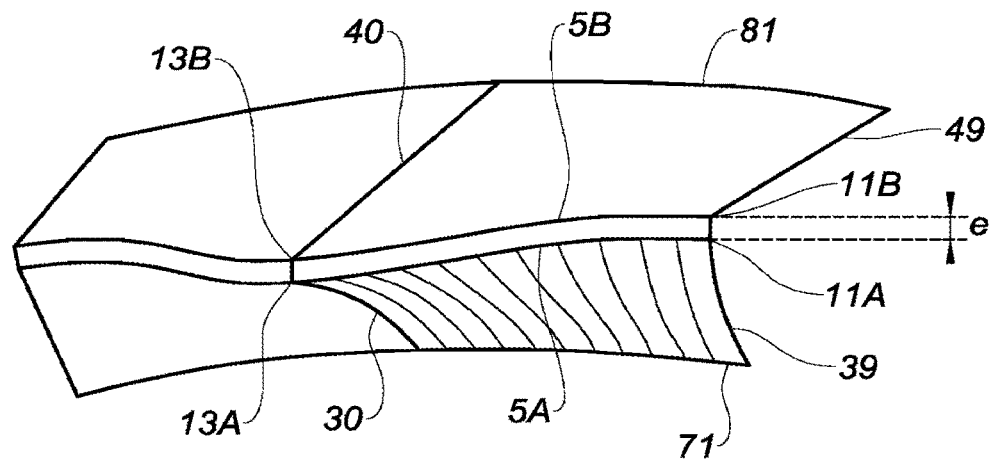
FIG. 5 is an enlarged schematic perspective view of a cowl thus defined in the region of the chevrons and of the indentations.

Moreover, a three-dimensional tip-depression line defining the trailing edge 5 is calculated by known means in order to pass through the tops 11 of the indentations 9 at the tips 13 of the chevrons 10 according to the chosen shape, the distance of said line from the axis L-L varying monotonically, always in the same direction, from the top 11 of an indentation to the tip 13 of a neighbouring chevron 10. In fact, an internal line 5A and an external line 5B, separated by the thickness e, define this trailing edge respectively for the internal 3 and external 4 walls of the cowl. As indicated in FIGS. 4 and 5, in the embodiment the radial thickness of the contour of each indentation 9—defined between trailing edge lines 5A and 5B—is kept constant along said trailing edge. Said thickness is preferably equal to the thickness of the trailing edge of the cowl 2 of the reference nozzle 1, that is to say for example 3.5 mm.

As shown in FIG. 4, the surface defining the external wall 4 of the cowl towards the trailing edge 5 is determined by known computer-assisted design means, by portions between the indentations and the chevrons between the following curves:
- the line 81 defining the external wall of the cowl on the sectional plane of the abscissa X1, between the points 82 and 83,
- the trailing edge line 5B between the points 11B and 13B,
- the line 40 connecting the points 83 and 13B in the axial half-plane of the chevrons,
- the line 49 connecting the points 82 and 11B in the axial half-plane of the indentations.

In addition, it is preferably required that the sectional lines of this surface through any axial half-plane do not have any turning points. Moreover, a tangent continuity of the connection surfaces with the surface 4 of the cowl is preferably required upstream of the line 81 at the connection point. Thus disruptions to the external flow F2 are avoided. Preferably, the tangent of the sectional line of the surface defining the external wall in any axial half-plane is required to be always oriented towards the axis, whilst maintaining the fact that this external surface has no turning point.

As can be seen in FIG. 3, it should be noted that in this surface construction the axial sectional line 40 passing through the tip 13B of the chevron is approximately in the extension of the profile of the initial nozzle and that the axial sectional line 49 passing through the top of the indentation corresponds to a recess with respect to this profile. In this configuration, the external wall 4 of the cowl remains entirely inside the surface created by the revolution about the axis L-L of the line 40 defining its trace in the axial half-plane passing through the tip of the chevrons. Thus, the modified cowl does not have, radially, overall dimensions greater than that of the reference nozzle.

The surface defining the internal wall 3 of the cowl 2 towards the trailing edge 5 is determined between the chevrons and the indentations in the same way as the external wall 4, by:
- the curve 71 of the cross-section of the internal wall 3 in the plane of the abscissa X1 between the points 72 and 73,
- the internal trailing edge line 5A between the points 11A and 13A, the line 30 connecting the points 73 and 13A in the axial half-plane of the chevrons,
- the line 39 connecting the points 72 and 11A in the axial half-plane of the indentations.

Moreover, a tangent continuity, in any axial half-plane, of the connection surfaces with the internal wall 3 of the cowl is preferably required upstream of the line 71 at the connection point.

It should be noted, as can be seen from FIG. 3, 4 or 5, and from the conditions imposed, that from the tip 13A of the chevron towards the top 11A of the indentation, the axial lines of the surfaces defining the internal wall 3 progressively change orientation: they converge constantly without a turning point in the region of the chevron, they diverge in the region of the indentation. Advantageously, these lines are convex when viewed from the axis L-L around the top 11A of the indentation 9 and their tangent in the region of the trailing edge line 5A is divergent. The angle $\alpha$ of the tangent of the axial line 39 is positive, as is indicated in FIG. 3.

Moreover, as can be seen in FIG. 5, the cowl obtained by assembling these surfaces has an azimuthal alternation between convergent angular sectors centred around axial half-planes passing through the tips 13A of the chevrons 10, and divergent sectors centred around axial half-planes passing through the tops 11A of the indentations 9.

A brief description of the different steps enabling the definition of the optimised nozzle equipped with chevrons 10 is given below.

In a preliminary phase, an initial value is attributed to the dimensional parameters defining the chevrons 10 and the indentations 9 towards the trailing edge 5 of the cowl 2, namely the parameters e, X0, X1, X2, X3, R0, R1, R2, R3, $\theta$, $\gamma$, $\beta$ and $\alpha$.

Then, by any means accessible to a person skilled in the art, performance criteria which are associated with the optimised nozzle equipped with chevrons 10 and designed with the aid of the aforementioned dimensional parameters are calculated. These criteria are for example the three criteria introduced previously, namely the thrust coefficient at cruising speed $CT_{CC}$, the difference CV_DV between the flow rate coefficient at take-off speed $CD_{CTO}$ and the flow rate coefficient at cruising speed $CD_{CC}$, the difference $\Delta$EPNdB between the intensity of the jet noise of the reference nozzle 1i and that of the nozzle equipped with chevrons according to the invention.

Predefined performance conditions to be satisfied are also associated with each criterion, in particular:
- the performance condition associated with the difference between the thrust coefficients $\Delta$CT is satisfied when this difference $\Delta$CT is less than a second predefined threshold. Said threshold is, for example, equal to 0.001 (that is to say $\Delta$CT<0.001);
- the performance condition associated with the difference between the flow rate coefficients CV_DV is satisfied when this difference CV_DV is at least equal to a first predefined threshold. Said threshold is, for example, equal to 0.015 (that is to say CV_DV$\geq$0.015); and
- the performance condition associated with the difference between intensities of the jet noise $\Delta$EPNdB is satisfied when this difference $\Delta$EPNdB is positive (that is to say $\Delta$EPNdB>0) and, preferably, at least equal to a third predefined threshold.

Then an optimisation algorithm is applied to the set of dimensional parameters thus initialised in order to define the shape of the cowl 2 equipped with chevrons, such that the optimised nozzle 1 satisfies the predefined conditions on said performance criteria.

For example, it is verified that the aforementioned three performance criteria CV_DV, $\Delta$CT and $\Delta$EPNdB calculated with the initial values of the dimensional parameters each satisfy predefined performance conditions which are respectively associated with them.

In the case where at least one of said calculated performance criteria does not satisfy the performance condition associated therewith, a new initial value is attributed to at least one of the aforementioned dimensional parameters, and then the three performance criteria are calculated again. For example, the new initial value can correspond to the previous initial value incremented by one unit.

As long as the conditions associated with the three performance criteria are not satisfied simultaneously, the aforementioned two steps from the preceding paragraph are repeated.

When the three calculated performance criteria satisfy the associated performance conditions, the last values attributed to the dimensional parameters are validated in order to define the definitive shape of the walls 3 and 4 of the cowl 2 of the optimised nozzle 1.

SECOND EMBODIMENT: CONVERGENT REFERENCE NOZZLE

In this variant, the reference nozzle 1*i* is simply convergent. An attempt will then be made to reduce the effect of supplementary convergence introduced by chevrons.

The cowl 2 of the nozzle obtained according to the present invention has, towards its trailing edge 5, a shape comprising chevrons 10 and indentations 9, which is defined by the same parameters as those of the first embodiment.

In this case there is no predefined neck, since the reference nozzle is convergent. A preliminary step therefore consists in choosing a cross-section 7, for an abscissa X0 on the axis L-L upstream of the outlet 6*i* of the reference nozzle 1*i*, on the basis of which the shape of the internal wall 3 of the cowl 2 of the optimised nozzle is modified. Once this abscissa X0 is determined, the construction of the surfaces defining the internal 3 and external 4 walls of the cowl 2 uses the same parameters and the same method as for the first embodiment.

The method for defining the optimised nozzle therefore comprises a preliminary step compared with the first embodiment which consists in choosing the abscissa X0 of the neck cross-section of the optimised nozzle. Since the reference nozzle 1*i* is convergent, the more this abscissa X0 is raised in the upstream direction, the larger the neck cross-section 7 is and the more it is possible, as compensation, to make the chevrons 10 convergent.

The method for defining the optimised nozzle then repeats the steps of the method used in the first embodiment.

THIRD EMBODIMENT: ANNULAR REFERENCE NOZZLE

Figure 6:
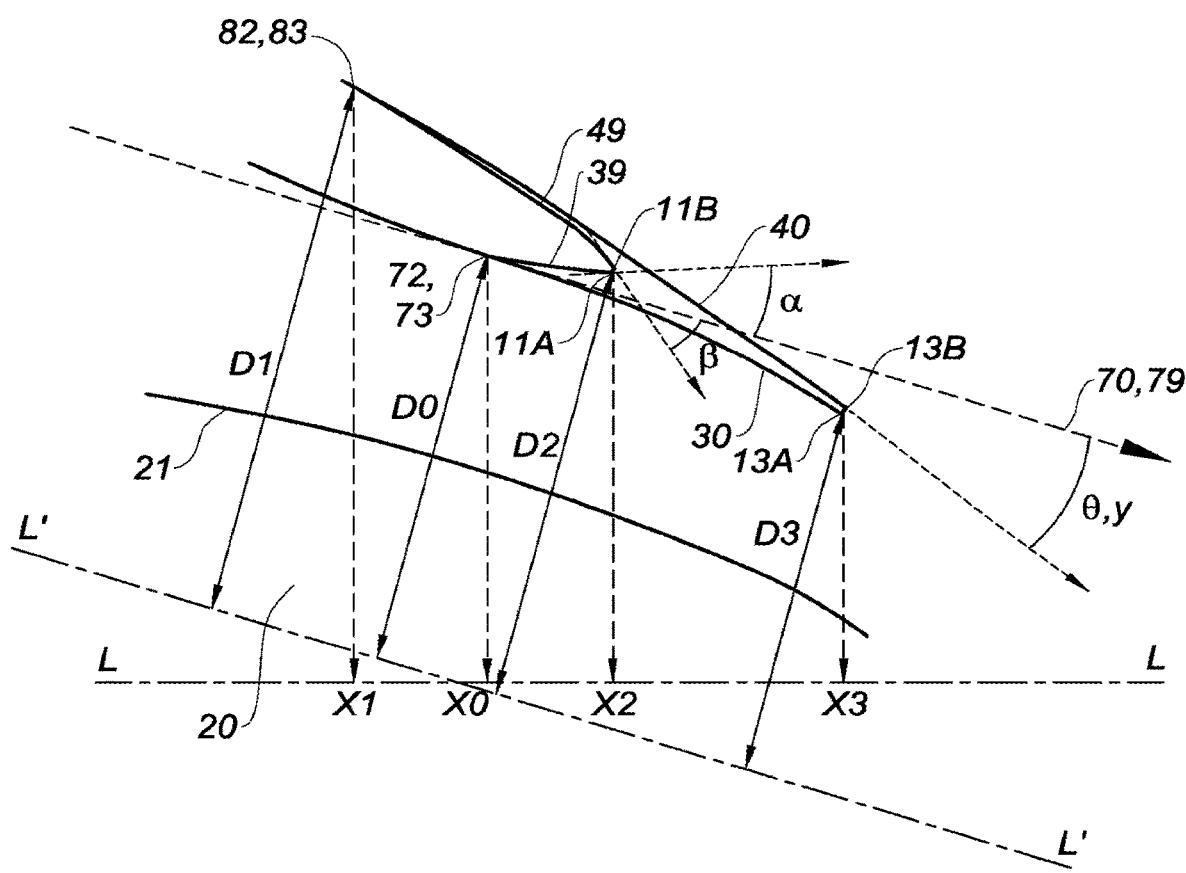
FIG. 6 is a superimposition of the schematic cross-sections of the rear of a nozzle according to the invention in the case where the cowl surrounds a central body of the turbine engine, along the axial half-planes passing through the tip of a chevron and through the top of an indentation, referencing the distances with respect to an axis parallel to the tangent to the neck.

In the case of an exhaust nozzle for a double-flow turbojet engine for example, the nozzle corresponds to the air conduit defined between the internal wall of a cowl 2 and the wall 21 of a central body 20 of circular cross-section around the axis L-L shown in FIG. 6.

The cross-section of the nozzle is no longer defined by the radius of the internal face of the cowl 2. Known methods are used in this configuration and define, as the cross-section, a surface which is substantially perpendicular to the mean flow, which is no longer a plane perpendicular to the axis L-L. For example, the calculation method known as "rolling ball" consists in making a ball roll on one of the walls. When this ball touches the two walls, the line which joins the two points of contact defines the passage cross-section between these two points. By varying the diameter of the ball it is thus possible to define the passage cross-section over the length of the nozzle. Next, the convergent or divergent nature of the nozzle is characterised as a function of the evolution of the surface area of this surface as it progresses downstream.

For the implementation of the invention, the shape of the wall 21 is not modified. Use is then made of the fact that the wall 21 of the central body is a determined surface area having a relatively regular shape, and that the aim is to characterise portions of wall 3 or 4 of the cowl 2 for which the nozzle cross-section is uniformly convergent or divergent. The object of the invention is also repeated, which is that of:

constructing re-entrant chevrons 10 in the flow F1 coming from the neck 7, constructing indentations 9 causing divergence of this same flow F1, and guiding the external flow F2 towards the flow F1 coming from the neck in the region of the indentations 9.

In a first variant of the invention, the variations in cross-section which a method of the "rolling ball" type could provide are approximated by the procedure described below. Reference is made to the mean direction of flow F1 at the neck 7. The tangent of the internal wall 3 of the cowl 2 on the neck line 71 in an axial half-plane is no longer obligatorily parallel to this axis.

On the contrary, this tangent substantially follows the mean flow around the central body 20 and its direction therefore represents approximately the direction of the internal flow F1 close to the cowl in the axial half-plane, in the region of the cross-section of the neck. Therefore, in the definition of the lines 30 and 39 or 40 and 49 defining the internal 3 and external 4 walls of the cowl 2 in the relevant axial half-planes, the direction of the axis L-L is replaced by that of the tangent 70 or 79 defined in this half-plane by the internal wall upstream of the corresponding points 72 or 73 on the neck line 71.

FIG. 6 shows the rear of an optimised nozzle according to the invention, repeating the notations of the first embodiment. The different characteristic locations on the cowl 2, the end of the chevrons 13, the top 11 of the indentations, the line 71, corresponding to the points 72 and 73, of the neck cross-section on the internal wall 3 of the cowl, and the line 81, corresponding to the points 82 and 83, of the cross-section of the external wall of the cowl, are referenced by their respective abscissas on the axis L-L: X3, X2, X0, X1.

In contrast, in each axial half-plane, a straight line L'L' parallel to the tangents 70 and 79 respectively, and passing through the point X0 of the neck 7 is defined. The conditions for the divergence of the characteristic points are then determined by their respective distances from this straight line L'L': D3, D2, D0, D1. Moreover, the angles of the tangents are likewise calculated with respect to this straight line L'L'.

Using these conventions, the same steps defining the walls of the cowl 2 as in the first embodiment are repeated but:

the radius at a point on an internal 3 or external 4 wall of the cowl 2 is replaced by the divergence at this point from the straight line L'L';

the angle formed by a tangent in an axial half-plane at a point on a wall of the cowl with the axis L-L is replaced by the angle which said tangent forms with the tangent of the internal wall 3 on the neck line 71.

In this way, the condition observed in the first embodiment is apparent in the downstream direction from the abscissa X0:

the sectional line 30 in the axial half-plane passing through the tip 13 diverges radially towards the interior of the tangent 70 to the neck, the sectional line 39 in the axial half-plane passing through the top 11 diverges radially towards the exterior of the tangent 79 to the neck, and the sectional line 49 in the axial half-plane passing through the top 11 moves radially closer to the tangent 79 to the neck.

The algorithm for defining the cowl then repeats the same steps as in the first embodiment in order to obtain a nozzle which meets the required performance criteria.

Figure 7:
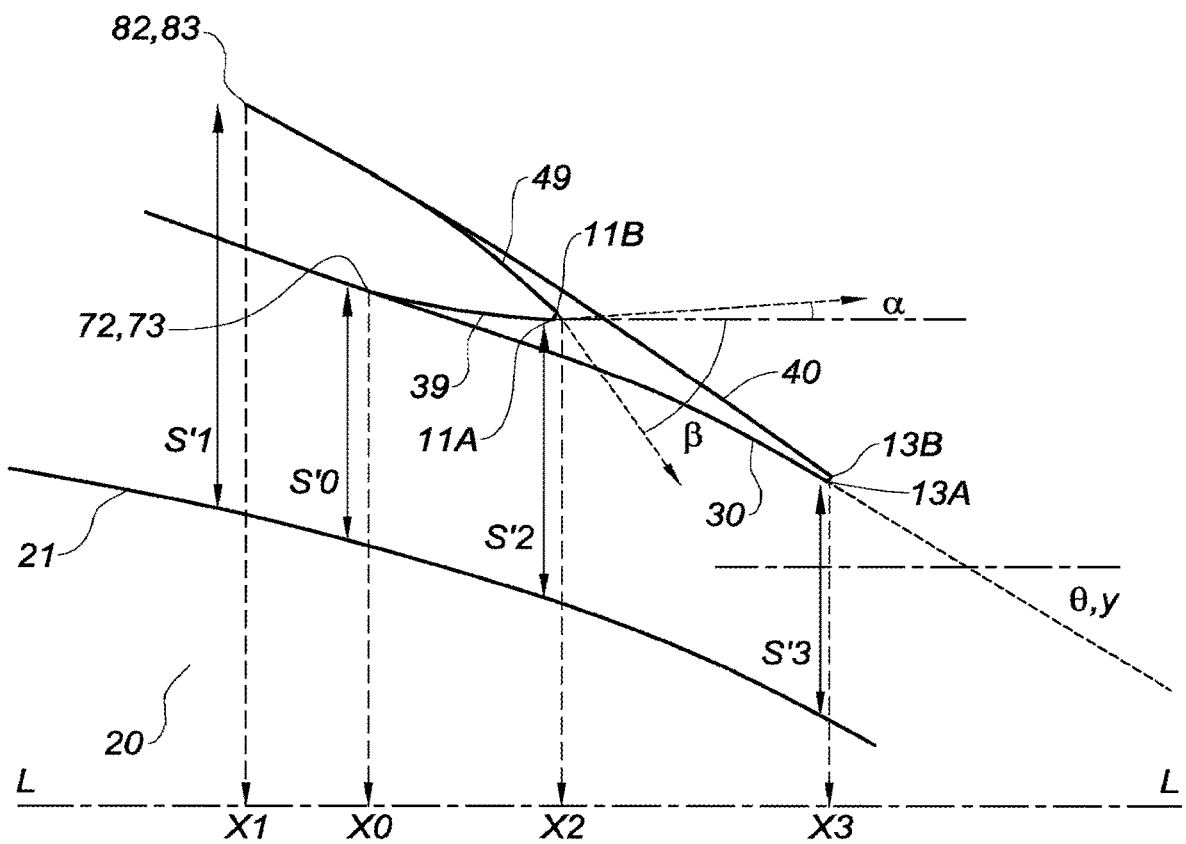
FIG. 7 shows the same geometric configuration as FIG. 6, but referencing the distances with respect to the axis of the nozzle.

A variant in this configuration, shown in FIG. 7, consists in referring to the surface area of cross-sections defined in the plane perpendicular to the central axis L-L, even if they are not actually perpendicular to the mean flow. In this case, the radial passage cross-section $S'=(R_{exterior}^2-R_{interior}^2)$ at a point on the walls of the cowl 2 is defined as the difference between the square, $R_{exterior}^2$, of the distance of this point from the axis L-L, and the square, $R_{interior}^2$, of the distance from the axis L-L of the point on the wall 21 of the central body 20 situated on the same radius perpendicular to the axis L-L, when the central body is present in the sectional plane transverse to the axis L-L containing this point. When the central body is not present in the sectional plane transverse to the axis L-L containing a point on a wall of the cowl, the radial passage cross-section is simply the square of the distance of this point from the axis L-L.

By applying the convergence and divergence criteria to the radial passage cross-section, this variant is then transposed directly from the first embodiment by replacing the radii R0, R1, R2 and R3 by the corresponding radial passage cross-sections S'0, S'1, S'2, and S'3.

The method can be immediately transposed to the case where the reference nozzle is simply convergent as in the second embodiment.

Finally, the invention also applies to a generalisation of the three examples presented, for a nozzle which is not necessarily circular around the axis L-L. In a variant of the method applied to this case, the surfaces of the cowl are defined by the sectional lines in the successive axial planes by turning azimuthally about a central axis L-L. The parameters defining the indentations 9 and the chevrons 10 in the different axial planes are then different according to the azimuth of the axial plane, as a function of the shape required for the transverse cross-section of the nozzle around this axis L-L. In contrast, the shape of the sectional lines of the internal 3 and external 4 walls of the cowl 2 in the axial planes passing through the tops 11 of the indentations 9 and through the tops 13 of chevrons 10 follow the conditions previously set out with respect to the points 72 and 73 of the neck line.

The invention claimed is:

1. A cowl for a nozzle having a longitudinal axis L-L, comprising:
    an external wall and an internal wall, the cowl being delimited radially towards an exterior by the external wall and, radially towards an interior, by the internal wall,
    the internal wall of the cowl having a cross-section with a determined abscissa on the axis L-L defining a neck line on the internal wall, said neck line being at the smallest cross sectional area of said nozzle, said internal wall converging towards the axis L-L upstream of said cross-section and having, in any axial half-plane, a defined upstream tangent at its intersection with the neck line,
    said cowl having, downstream of said determined abscissa, indentations in a trailing edge of the cowl which delimit chevrons distributed in a circumferential direction,
    wherein in a downstream direction from said determined abscissa,
        the internal wall of the cowl diverges radially towards the exterior, in a first axial half-plane of any axial half-plane passing through the top of an indentation, from the upstream tangent on the tip of the neck line in said first axial half-plane of the any axial half-plane, from said neck line to said trailing edge of said first axial half-plane of the any axial half-lane,
        the external wall of the cowl moves closer, in said first axial half-plane of, the any axial half-plane, to the upstream tangent on the tip of the neck line in said first axial half-plane of the any axial half-plane, from said neck line to said trailing edge of said first axial half-plane,
        the internal wall of the cowl diverges radially towards the interior, in a second axial half-plane of the any axial half-plane passing through the tip of a chevron, from the upstream tangent on the point of the neck line in said second axial half-plane of hg any axial half-plane, from said neck line to said trailing edge of said second axial half-plane and
        lines defining the internal wall of the cowl in the any axial half-plane do not have a turning point downstream of said determined abscissa of the neck line.

2. The cowl for the nozzle according to claim 1, wherein the lines defining the internal wall, respectively the upstream and the downstream of the neck line in the any axial half-plane, have the same tangent on the neck line.

3. The cowl for the nozzle according to claim 1, of which a first line, defining the internal wall of the cowl downstream of said determined abscissa in an axial half-plane of the any axial half-plane passing through the tip of a chevron, is concave when viewed from the axis L-L.

4. The cowl for the nozzle according to claim 1, of which a second line, defining the internal wall of the cowl downstream of said determined abscissa in an axial half-plane of the any axial half-plane passing through the top of a chevron, is convex when viewed from the axis L-L.

5. The cowl for the nozzle according to claim 1, of which a third line, defining the external wall of the cowl downstream of said determined abscissa in an axial half-plane of the any axial half-plane passing through the top of a chevron, is concave when viewed from the axis L-L.

6. The cowl for the nozzle according to claim 1, of which the lines defining the external wall of the cowl in the any axial half-plane do not have a turning point downstream of said determined abscissa of the neck line.

7. The cowl for the nozzle according to claim 1, of which a thickness of the cowl on its trailing edge is substantially constant.

8. A nozzle for a turbine engine having the longitudinal axis L-L comprising the cowl according to claim 1.

9. The nozzle according to claim 8, further comprising: a central body of revolution about the axis L-L.

10. The nozzle according to claim 9, in which a radial passage cross-section at a point on one of the internal wall and the external wall of the cowl is defined as the square of a radial distance of said point on the one of the internal wall and the external wall from the axis L-L minus the square of the radial distance of the axis L-L from a point of a wall of the central body situated on a radius on a same axial plane as the point on the one of the internal wall and the external wall of the cowl radius when said central body is present at the axial plane abscissa on the axis L-L of said point, and by the square of the radial distance of said point on the cowl from the axis L-L when this is not the case, said nozzle being characterized in that, in the downstream direction from said determined abscissa of the neck line, the radial passage cross-section of the internal wall of the cowl increases in an axial half-plane of the any axial half-plane passing through the top of an indentation.

\* \* \* \* \*

UNITED STATES PATENT AND TRADEMARK OFFICE
CERTIFICATE OF CORRECTION

PATENT NO. : 11,274,632 B2
APPLICATION NO. : 16/381326
DATED : March 15, 2022
INVENTOR(S) : Jonathan Langridge et al.

It is certified that error appears in the above-identified patent and that said Letters Patent is hereby corrected as shown below:

In the Specification

Column 8, Line 38, delete "$\alpha$" and insert -- $\gamma$ --, therefor.

In the Claims

Column 14, Claim 1, Line 4, delete "half-lane," and insert -- half-plane, --, therefor;

Column 14, Claim 1, Line 6, delete "of," and insert -- of --, therefor;

Column 14, Claim 1, Line 16, delete "hg" and insert -- the --, therefor.

Signed and Sealed this
Twenty-sixth Day of July, 2022

Katherine Kelly Vidal
*Director of the United States Patent and Trademark Office*